May 2, 1939. J. R. GAMMETER 2,157,054
METHOD AND APPARATUS FOR MAKING PROTECTIVE COVERS OR CONTAINERS
Filed Sept. 1, 1936 4 Sheets-Sheet 3
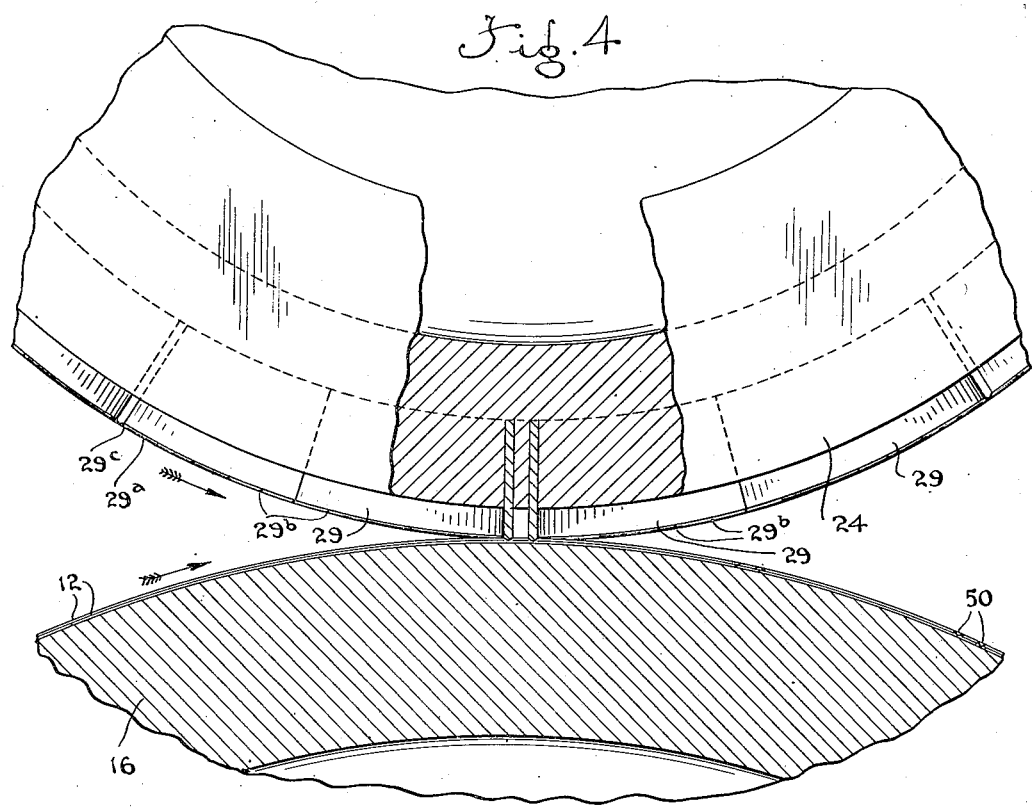
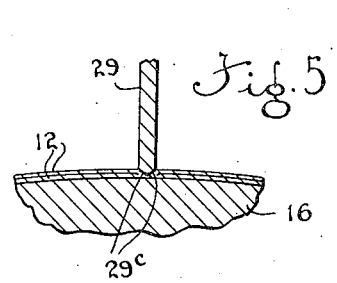
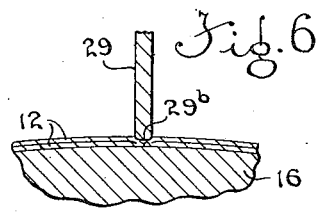
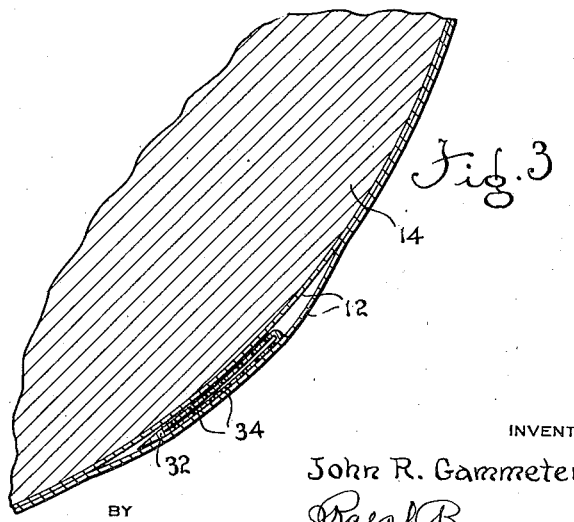
INVENTOR
John R. Gammeter
BY J Ralph Barrow
ATTORNEY May 2, 1939.  J. R. GAMMETER  2,157,054
METHOD AND APPARATUS FOR MAKING PROTECTIVE COVERS OR CONTAINERS
Filed Sept. 1, 1936  4 Sheets—Sheet 4
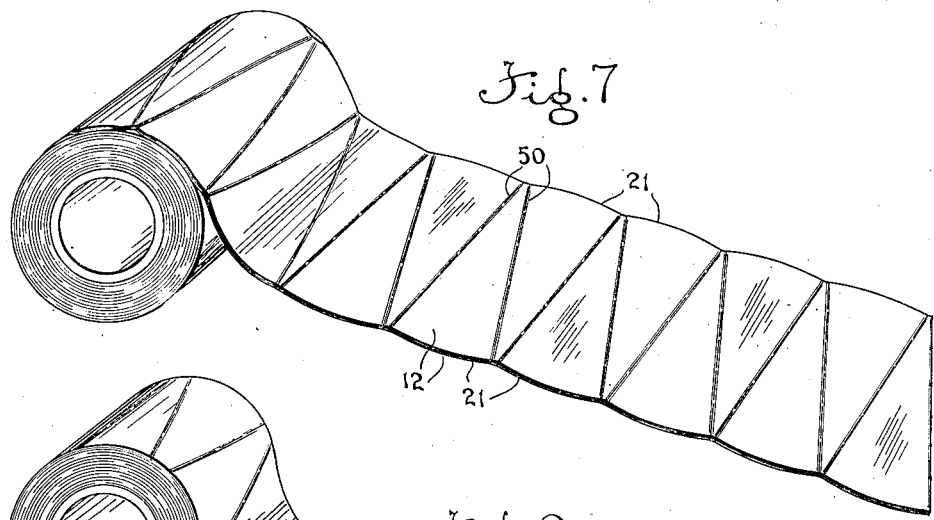
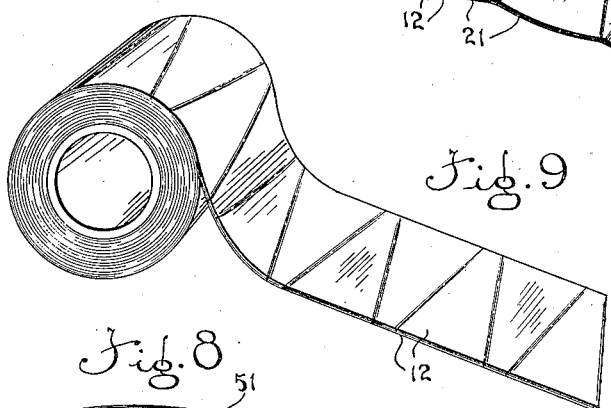
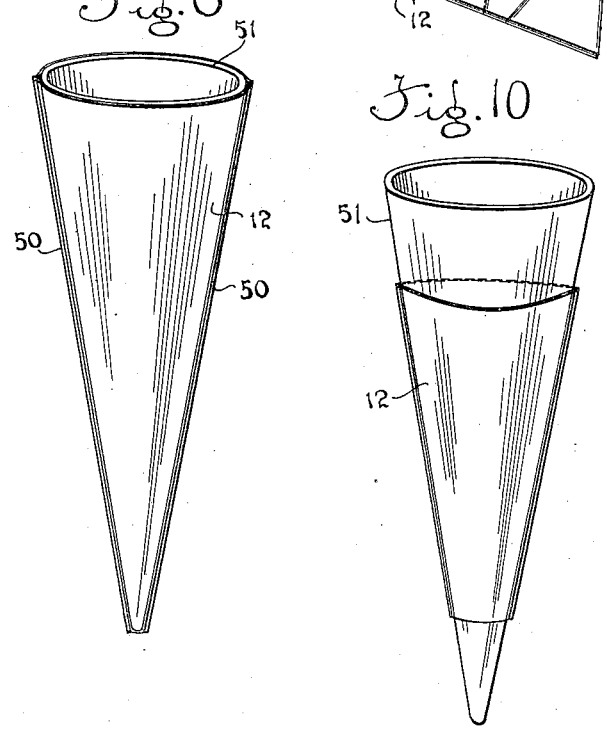
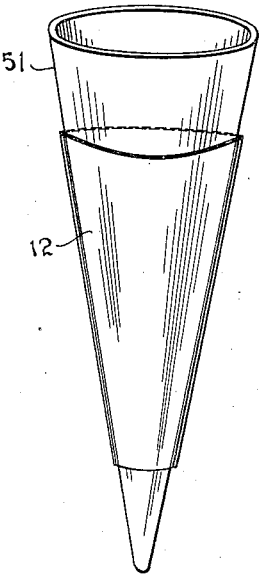
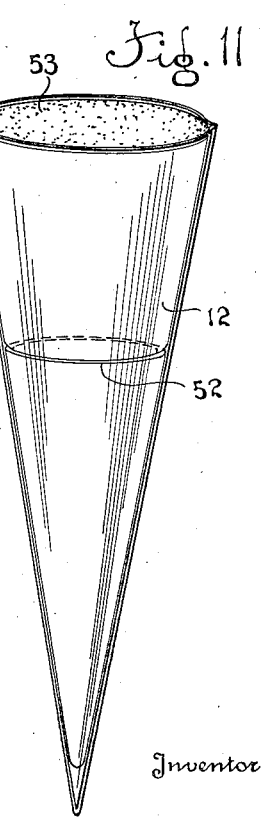
Inventor
John R. Gammeter
By Ralph Barrow,
Attorney Patented May 2, 1939

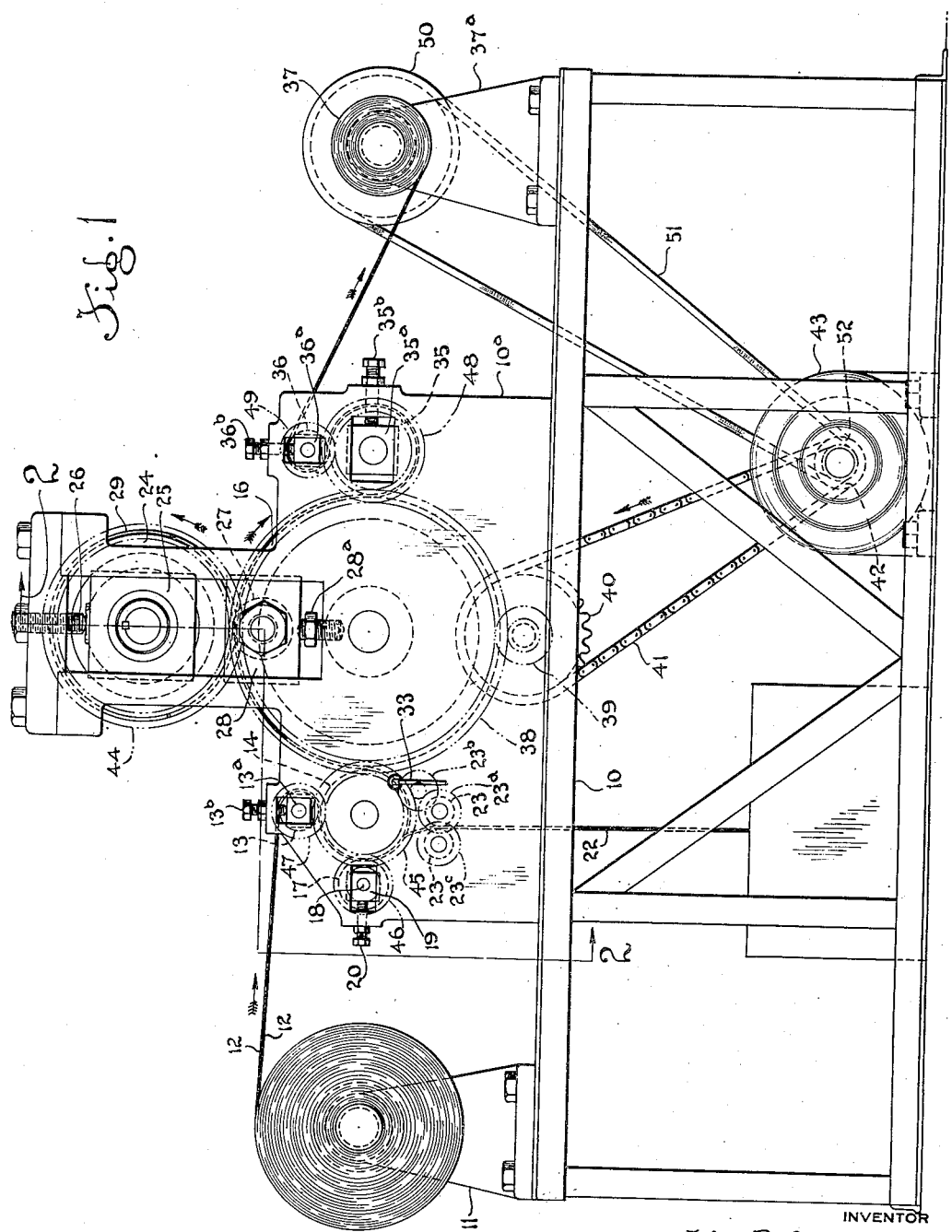

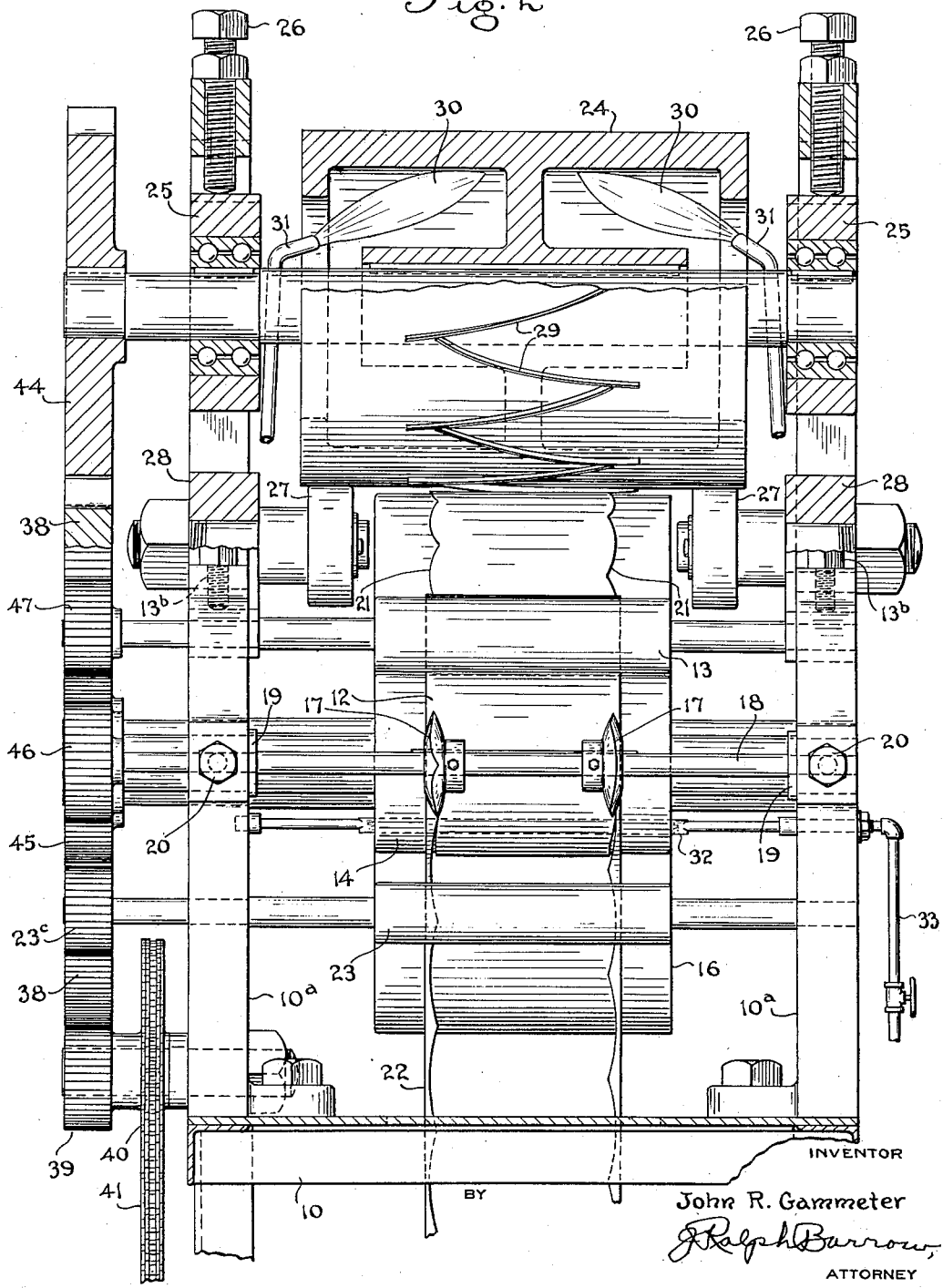

2,157,054

UNITED STATES PATENT OFFICE

2,157,054

METHOD AND APPARATUS FOR MAKING PROTECTIVE COVERS OR CONTAINERS

John R. Gammeter, Akron, Ohio, assignor to United States Rubber Company, New York, N. Y., a corporation of New Jersey Application September 1, 1936, Serial No. 99,001

24 Claims. (Cl. 93—8)

This invention relates to containers or protective coverings for articles such as ice cream cones and to such articles.

The sale of ice cream cones involving the use of edible cones of cake or the like filled with ice cream has been a very voluminous business for a great many years and yet no more unsanitary disposal of edible materials could be devised than the customary practise of holding the cone in the hand while filling the cone with ice cream. By means of the present invention cones may be economically provided with protective coverings whereby the human hand does not touch them at any time.

There is on the market a thin flexible translucent or transparent impervious sheet material, a derivative of rubber which is rendered adhesive by the application of heat. This material is called "Pliofilm". Other materials of these characteristics and either translucent, transparent or opaque are available or being developed. Such materials have excellent germ-proof and protective qualities, and by the present invention may be easily and economically formed into protective containers for cones and other confections and food stuffs, etc.

The general purpose of the present invention is to provide a simple method and apparatus for making containers of protective material of this sort and more particularly for making ice cream cone covers. This invention also relates to the container itself and to the protected cones or the like. And the invention is capable of general application to the manufacture and use of protective containers or protective covers of various shapes and sizes for various articles for preserving the articles in a fresh, germ-proof condition.

The foregoing and other purposes of the invention are attained by the practise of the method and the use of the apparatus and by the protected articles illustrated in the accompanying drawings and described below. It is understood that the invention is not limited to the specific forms thereof shown and described.

Of the accompanying drawings:

Figure 1 is a side elevation of the improved apparatus illustrating the use thereof to carry out the improved process.

Figure 2 is a sectional elevation on line 2—2 of Figure 1.

Figure 3 is an enlarged fragmentary longitudinal section through the machine showing a device for applying suitable separating material between layers of the sheet material from which the containers are made.

Figure 4 is a similar view showing the container forming rolls.

Figure 5 is a fragmentary sectional view through the cutting and pressing blade used for forming the containers.

Figure 6 is a similar view showing a section of the blade at a notch therein by which small connecting strips may connect the containers in a continuous strip when formed.

Figure 7 is a perspective view of a roll of the finished containers in connected condition.

Figure 8 is a perspective view of a cone having a protection thereon in accordance with the invention.

Figure 9 is a view similar to Figure 7 of a modified form of the container.

Figure 10 is a view similar to Figure 8 of another form of the protected cone and Figure 11 is a similar view of another form of protective cone.

Referring to the drawings, the numeral 10 designates a suitable frame or table on one end of which may be provided a bracket 11 for removably receiving a reel comprising superposed layers 12, 12 of the sheet material described. This reel has associated therewith any suitable tensioning device (not shown) such as have long been used in the winding and reeling art whereby material being continuously withdrawn from the reel may be maintained under tension.

A material guiding roll 13, journaled in adjustable bearings 13$^a$, 13$^a$ adjusted by screws 13$^b$, 13$^b$, may be adapted to be held under pressure against a roll 14. The material 12, 12 may be trained to pass about and under the roll 14. Roll 14 in turn carries the material to the surface of a roll 16 on which the containers are made, the roll 14 preferably being arranged so that the material may pass over the upper surface of roll 16. The rolls 14 and 16 may be made of hardened material to provide a surface against which the material may be cut.

To produce a container of true hollow conical shape, a pair of rotary cutters 17, 17 may be mounted on a shaft 18 supported in adjustable bearings 19, 19 adjusted by screws 20, 20 whereby the knives or cutters 17 may be pressed against the roll 14 to cut through the layers 12 on roll 14. As shown in Figure 2, the knives 17 may be so shaped as to cut oppositely staggered arcuate edges 21, 21 at the sides of the strips 12, 12 of the material for a purpose to be described. The material cut away from the edges of the strips as shown at 22, 22 may be drawn downwardly away from roll 14 between rollers 23, 23.

Cooperating with the upper surface of roll 16 is a cutter roll 24, this being shown mounted in bearings 25, 25 adjustable by screws 26, 26 whereby the roll 24 may be held under pressure against roll 16. Rollers 27, 27 in adjustable bearings 28, 28 are provided to be adjusted upwardly tightly against roll 24, by means of screws 28ª, 28ª, to prevent chattering of roll 24. Secured in roll 24 are blades 29, 29 so formed and arranged as to press against areas of the material 12 along angular lines from the vertices of the arcs 21 at one side to the vertices of such arcs at the other side. These knives are preferably of the shape shown in Figures 4, 5 and 6 and are provided with a cutting edge at 29ª preferably nicked or notched at spaced points as at 29ᵇ and having more or less flat beveled faces at 29ᶜ, 29ᶜ at each side of the cutting edge for pressing the margins of the layers of material 12 together at each side of the cuts. The blades 29 are heated as by heating roll 24 with gas flames 30, 30 from suitable burners 31, 31 whereby under the heat and pressure of the blades 29 the cut edges of the material 12 are caused to be adhesively joined. It will be noted that the blades either partially or completely sever the material at the sharp edges thereof excepting at nicks or notches 29ᵇ and cause the margins of the layers to be adhesively joined adjacent the cut edges. The blades are so arranged as to cut the containers complementary to each other to use a minimum of material.

It will be observed that the cutting action of blades 29 is progressive in that at any given instant they contact with the material at only one point on the periphery of the roll 16. The cutting action of knives 17 is also progressive. By the arrangement shown considerable pressure is applicable at a single point of cutting whereby the cutting is easily and effectively accomplished.

In order to permit the easy separation of the layers 12 of material in the finished containers, the layers may be wetted by a blade 32 arranged in association with roller 14 (see Figures 2 and 3) whereby water or a mixture of water and glycerine may be applied between the layers before they reach roll 16. The blade 32 separates the layers, one layer passing over and under the blade breaking any adhesion between the layers including such adhesion due to cutting the edges thereof by cutters 17 and insuring that in the finished containers the layers adhere only at the cut edges of the material where the pressure of heated blades 29 has been applied. The blade 32 may be made hollow, as shown and water or the like supplied thereto by pipe 33 and passing out to the surface of the blade through apertures 34, 34.

Journaled in adjustable bearings 35ª, 35ª and adjusted by means of screws 35ᵇ, 35ᵇ is a roll 35 arranged against roll 16, under which the strip of connected containers thus formed may be passed and a roll 36, in adjustable bearings 36ª, 36ª adjusted by screws 36ᵇ, 36ᵇ, is arranged in cooperation with roll 35 over which the strip of connected containers may be passed to wind-up reel 37 which may be supported on a bracket 37ª on the table 10. Roll 35 preferably has a resilient surface of rubber or the like. And in the production of the material shown in Figure 9 (later to be described) a similar roll may be substituted for roll 14 since cutters 17 will not be employed.

The rolls 14, 16 and 35 together with their associated rollers may be supported in brackets 10ª, 10ª on the table 10. Roll 16 may be driven by a gear 38 meshed with a pinion 39 driven by a sprocket 40 in turn driven by a chain 41 from a sprocket 42 driven through a suitable gear reduction and motor at 43. Gear 38 meshes with and drives gear 44 to drive the cutter roll 24. Gear 38 also meshes with and drives gear 45 on roll 14. The cutter knives 17 and the roll 13 may be driven by gears 46 and 47, respectively, meshed with gear 45 and one of the rolls 23 may be driven by a gear 23ª meshed with a gear 23ᵇ in turn meshed with gear 45, the other of said rolls 23 being driven by a gear 23ᶜ meshed with said gear 23ª. The roll 35 may be driven by a gear 48 meshed with gear 38, and roll 36 may in turn be driven by a gear 49 meshed with said gear 48. Reel 37 may be driven by a pulley 50, belt 51, and pulley 52 from the motor and gear reduction at 43.

The material resulting from the use of the apparatus illustrated is shown in Figure 7. After it has been made it is aged so that the material at the joints 50, 50 will become hardened after the heat treatment. The connected containers may then be readily snapped or torn apart and cones inserted therein in any suitable manner as shown at 51 in Figure 8. The cover can be torn or stripped from the cone as the cone is being consumed.

The material of Figure 7 provides complete cone-covers as shown in Figure 8, but cone-covers to permit sanitary handling may be provided as illustrated in Figure 9. Stock 12 of narrow width may be used for this purpose and the edges need not be cut by cutters 17 which with their associated mechanism may be eliminated. The resulting protected cone is illustrated in Figure 10.

As shown in Figure 11 large cone-shaped covers may be provided by the process and apparatus to receive a cone 52 packed with ice cream, the cover 12 being packed with ice cream at 53 above the cone. The consumer can squeeze the ice cream from the top portion of the cover as the ice cream is being consumed and then can tear the cover away or strip it down the cone so as to eat the cone itself with the contained ice cream.

Modification of the invention other than those referred to herein may be made without departing from the spirit thereof or the scope of the appended claims. It is understood that the method and apparatus is capable of general application to the making of other shapes and sizes of protective covers or containers for various articles.

What is claimed is:

1. That method for making containers or covers of flexible sheet material rendered adhesive by the application of heat which comprises applying superposed layers of said material to a surface and pressing said layers along predetermined lines with a heated blade without heating the material excepting adjacent the blade to sever or partially sever the layers and to apply pressure and heat adjacent the severed edges to cause the superposed layers only to adhere along the margins of the layers at the severed or partially severed edges, whereby the layers of material are later separable to receive an article or material.

2. That method of making containers or covers of flexible sheet material rendered adhesive by the application of heat which comprises applying superposed layers of the material to a surface and pressing said layers along predetermined lines to form complementary containers with a heated cutting and pressing blade without heating the material excepting adjacent the blade to sever or partially sever the material and to press the margins only of the layers along the severed lines together under heat to cause the layers to adhere, the layers between the lines being later separable, then separating the resulting containers from each other along the severed or partially severed lines.

3. That method for making containers or covers of flexible sheet material rendered adhesive by the application of heat which comprises applying superposed layers of said material with a separating material therebetween to a surface and pressing said layers along predetermined lines with a heated blade without application of heat to the layers excepting immediately adjacent the blade to sever or partially sever the layers and to apply pressure and heat adjacent the severed edges to cause the superposed layers to adhere along the margins of the layers at the severed or partially severed edges, the layers between said lines being later separable.

4. That method of making containers or covers of flexible sheet material rendered adhesive by the application of heat which comprises applying superposed layers of the material to a surface with a separating material therebetween and pressing said layers along predetermined lines to form complimentary containers with a heated cutting and pressing blade without heating the material excepting adjacent the blade to sever or partially sever the material and to press the margins of the layers along the severed lines together to cause the layers only to adhere, then separating, the resulting containers from each other along the severed or partially severed lines, whereby the layers of material are later separable to receive an article or material.

5. That method of making containers or covers of flexible sheet material rendered adhesive by the application of heat which comprises continuously applying superposed layers of the material in strip form to a surface and continuously pressing said layers along predetermined lines to form complementary containers with a heated cutting and pressing blade without heating the material excepting adjacent the blade to sever or partially sever the material and to press the margins of the layers along the severed lines together to cause the layers only to adhere, then separating the resulting containers from each other along the severed or partially severed lines, whereby the layers of material are later separable to receive an article or material.

6. That method of making containers or covers of flexible sheet material rendered adhesive by the application of heat which comprises continuously applying superposed layers of the material in strip form to a surface with a separating material therebetween and continuously pressing said layers along predetermined lines to form complementary containers with a heated cutting and pressing blade without heating the material excepting adjacent the blade to sever or partially sever the material and to press the margins of the layers along the several lines together to cause the layers only to adhere, then separating the resulting containers from each other along the severed or partially severed lines, whereby the layers of material are later separable to receive an article or material.

7. That method of making containers or covers of flexible sheet material rendered adhesive by the application of heat which comprises applying superposed layers of the material to a surface and pressing said layers along predetermined lines to form complementary containers with a heated cutting and pressing blade without heating the material excepting adjacent the blade to sever or partially sever the material and to press the margins of the layers along the severed lines together to cause the layers only to adhere, aging the material thus formed to allow the heated material along said lines to harden then separating the resulting containers from each other along the severed or partially severed lines, whereby the layers of material are later separable to receive an article or material.

8. That method of making containers or covers of flexible sheet material rendered adhesive by the application of heat which comprises applying superposed layers of the material to a surface with a separating material therebetween and pressing said layers along predetermined lines to form complementary containers with a heated cutting and pressing blade without heating the material excepting adjacent the blade to sever or partially sever the material and to press the margins of the layers along the severed lines together to cause the layers only to adhere, aging the material thus formed to allow the heated material along said lines to harden then separating the resulting containers from each other along the severed or partially severed lines, whereby the layers of material are later separable to receive an article or material.

9. That method of making containers or covers of flexible sheet material rendered adhesive by the application of heat which comprises continuously applying superposed layers of the material in strip form to a surface and continuously pressing said layers along predetermined lines to form complementary containers with a heated cutting and pressing blade without heating the material excepting adjacent the blade to sever or partially sever the material and to press the margins of the layers along the severed lines together to cause the layers only to adhere, aging the material thus formed to allow the heated material along said lines to harden then separating the resulting containers from each other along the severed or partially severed lines, whereby the layers of material are later separable to receive an article or material.

10. That method of making containers or covers of flexible sheet material rendered adhesive by the application of heat which comprises continuously applying superposed layers of the material in strip form to a surface with a separating material therebetween and continuously pressing said layers along predetermined lines to form complementary containers with a heated cutting and pressing blade without heating the material excepting adjacent the blade to sever or partially sever the material and to press the margins of the layers along the severed lines together to cause the layers only to adhere, aging the material thus formed to allow the heated material along said lines to harden then separating the resulting containers from each other along the severed or partially severed lines, whereby the layers of material are later separable to receive an article or material.

11. That method for making protective covers or containers which comprises providing a reel of superposed strips of sheet material adapted to be rendered adhesive by heat, continuously passing said strips between a pair of rolls one of said rolls being pressed against the other and having one or more cutting and pressing blades thereon, said blade being heated without heating the material excepting adjacent the blade whereby said superposed strips only are pressed together and adhere and severed or partially severed along predetermined lines and continuously withdrawing the series of connected covers or containers formed from between said rolls, whereby the strips of material are later separable to receive an article or material.

12. That method for making protective covers or containers which comprises providing a reel of superposed strips of sheet material adapted to be rendered adhesive by heat, continuously supplying a separating material between said superposed strips continuously passing said strips between a pair of rolls one of said rolls being pressed against the other and having one or more cutting and pressing blades thereon, said blade being heated without heating the material excepting adjacent the blade whereby said superposed strips only are pressed together and adhere and severed or partially severed along predetermined lines and continuously withdrawing the series of connected covers or containers formed from between said rolls, whereby the strips of material are later separable to receive an article or material.

13. That method for making protective covers or containers which comprises providing a reel of superposed strips of sheet material adapted to be rendered adhesive by heat, continuously passing said strips between a pair of rolls one of said rolls being pressed against the other and having one or more cutting and pressing blades thereon, said blade being heated without heating the material excepting adjacent the blade whereby said superposed strips only are pressed together and adhere and severed or partially severed along predetermined lines to form complementary containers and continuously withdrawing the series of connected covers or containers formed from between said rolls, whereby the strips of material are later separable to receive an article or material.

14. That method for making protective covers or containers which comprises providing a reel of superposed strips of sheet material adapted to be rendered adhesive by heat continuously supplying a separating material between said superposed strips, continuously passing said strips between a pair of rolls one of said rolls being pressed against the other and having one or more cutting and pressing blades thereon, said blade being heated without heating the material excepting adjacent the blade whereby said superposed strips only are pressed together and adhere and severed or partially severed along predetermined lines to form complementary containers and continuously withdrawing the series of connected covers or containers formed from between said rolls, whereby the strips of material are later separable to receive an artcile or material.

15. That method for making protective covers or containers which comprises providing a reel of superposed strips of sheet material adapted to be rendered adhesive by heat, continuously passing said strips between a pair of rolls one of said rolls being pressed against the other and having one or more cutting and pressing blades thereon, said blade being heated without heating the material excepting adjacent the blade whereby said superposed strips only are pressed together and adhere and severed or partially severed along predetermined lines and continuously withdrawing the series of connected covers or containers formed from between said rolls, aging the material to permit the material along said lines to harden and separating the containers from the strip, whereby the strips of material are later separable to receive an article or material.

16. That method for making protective covers or containers which comprises providing a reel of superposed strips of sheet material adapted to be rendered adhesive by heat, continuously supplying a separating material between said superposed strips, continuously passing said strips between a pair of rolls one of said rolls being pressed against the other and having one or more cutting and pressing blades thereon, said blade being heated without heating the material excepting adjacent the blade whereby said superposed strips only are pressed together and adhere and severed or partially severed along predetermined lines and continuously withdrawing the series of connected covers or containers formed from between said rolls, aging the material to permit the material along said lines to harden and separating the containers from the strip, whereby the strips of material are later separable to receive an article or material.

17. That method for making protective covers or containers which comprises providing a reel of superposed strips of sheet material adapted to be rendered adhesive by heat, continuously passing said strips between a pair of rolls one of said rolls being pressed against the other and having one or more cutting and pressing blades thereon, said blade being heated without heating the material excepting adjacent the blade whereby said superposed strips only are pressed together and adhere and severed or partially severed along predetermined lines to form complementary containers and continuously withdrawing the series of connected covers or containers formed from between said rolls, aging the material to permit the material along said lines to harden and separating the containers from the strip, whereby the strips of material are later separable to receive an article or material.

18. That method for making protective covers or containers which comprises providing a reel of superposed strips of sheet material adapted to be rendered adhesive by heat continuously supplying a separating material between said superposed strips, continuously passing said strips between a pair of rolls one of said rolls being pressed against the other and having one or more cutting and pressing blades thereon, said blade being heated without heating the material excepting adjacent the blade whereby said superposed strips only are pressed together and adhere and severed or partially severed along predetermined lines to form complementary containers and continuously withdrawing the series of connected covers or containers formed from between said rolls, aging the material to permit the material along said lines to harden and separating the containers from the strip, whereby the strips of material are later separable to receive an article or material.

19. That method for making cone covers which comprises superposing strips of sheet material which may be rendered adhesive by application of heat, cutting oppositely staggered arcuate cuts along the edges of said strips to provide the tops of said covers, then cutting and pressing the sheets together along lines between the vertices of said arcs to sever or partially sever the material along said lines and to cause said strips to adhere at the margins of the cuts by the use of a heated cutting and pressing blade or blades without heating the material excepting adjacent the blade thereby forming complementary cone covers, allowing the strip material thus made to age to harden the heated portion thereof and separating the containers from each other, whereby the strips of material are later separable to receive an article or material.

20. That method for making cone covers which comprises superposing strips of sheet material which may be rendered adhesive by application of heat, cutting oppositely staggered arcuate cuts along the edges of said strips to provide the tops of said covers, then cutting and pressing the sheets together along lines between the vertices of said arcs to sever or partially sever the material along said lines and to cause said strips to adhere at the margins of the cuts by the use of a heated cutting and pressing blade or blades without heating the material excepting adjacent the blade thereby forming complementary cone covers, and separating the containers from each other, whereby the strips of material are later separable to receive an article or material.

21. Apparatus of the class described comprising cooperating rollers adapted to be pressed together one of said rollers having thereon a heated blade, and means for continuously passing superposed layers of sheet material adapted to be made adhesive by heat between said rollers, and means for heating said blade to sever or partially sever said material and simultaneously to secure adhesively the margins of the material along the line of severance or partial severance, without substantially heating the material between the lines of severance or partial severance.

22. Apparatus of the class described comprising cooperating rollers adapted to be pressed together one of said rollers having thereon a heated blade, and means for continuously passing superposed layers of sheet material adapted to be made adhesive by heat between said rollers, and means for heating said blade to sever or partially sever said material and simultaneously to secure adhesively the margins of the material along the line of severance or partial severance, said blade having a sharp edge with flat beveled pressing faces adjacent said edge, without substantially heating the material between the lines of severance or partial severance.

23. Apparatus of the class described comprising cooperating rollers adapted to be pressed together one of said rollers having thereon a heated blade, and means for continuously passing superposed layers of sheet material adapted to be made adhesive by heat between said rollers, and means for heating said blade to sever or partially sever said material and simultaneously to secure adhesively the margins of the material along the line of severance or partial severance, and means for introducing a separating material between said superposed layers prior to passage between said rollers, without substantially heating the material between the lines of severance or partial severance.

24. An implement for use in treating thermoadhesive material comprising a heated blade having a sharp edge for cutting through or partially through superposed layers of said material, said blade having a pressure face adjacent said edge to apply pressure to said layers so as adhesively to secure the layers together adjacent the cut, and means for heating and applying said blade to said material whereby the material is substantially heated only adjacent the line of cut.

JOHN R. GAMMETER.